United States Patent

Kondo

[15] 3,636,295
[45] Jan. 18, 1972

[54] POWER SOURCE DEVICE FOR ELECTRICAL DISCHARGE MACHINING

[72] Inventor: Iwao Kondo, 39-9 Kita-machi 1-chome, Nerima-ku, Tokyo, Japan

[22] Filed: Jan. 21, 1970

[21] Appl. No.: 4,538

[30] Foreign Application Priority Data

Jan. 21, 1969 Japan.....................................44/4538

[52] U.S. Cl. .......................................................219/69 C
[51] Int. Cl.........................................................B23k 9/16
[58] Field of Search.....................................................219/69

[56] References Cited

UNITED STATES PATENTS 3,178,551 4/1965 Webb ......................................219/69

OTHER PUBLICATIONS

Millman & Halkas, "Electronic Devices and Circuits" 1967, page 345.

Primary Examiner—J. V. Truhe
Assistant Examiner—Robert O'Neill
Attorney—Waters, Roditi, Schwartz and Nissen

[57] ABSTRACT

A power source device for electrical discharge machining, in which a large machining current in excess of a certain present limit is automatically reduced while continuing the machining operation. A current-detecting resistor is provided in series with a discharge gap for machining, which resistor generates an output when the machining current becomes too large. A switching element responds to the output from the current-detecting resistor and reduces the machining current.

9 Claims, 18 Drawing Figures

FIG. 1
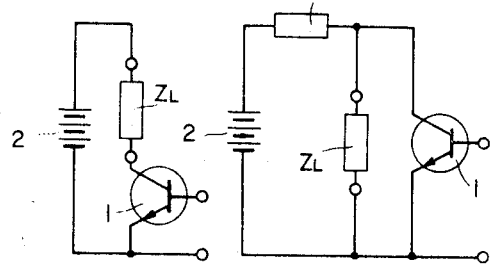
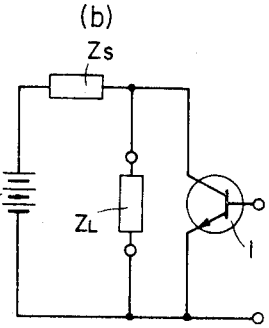
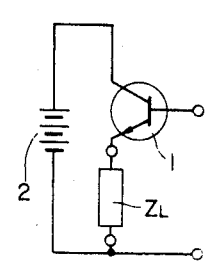
FIG. 2
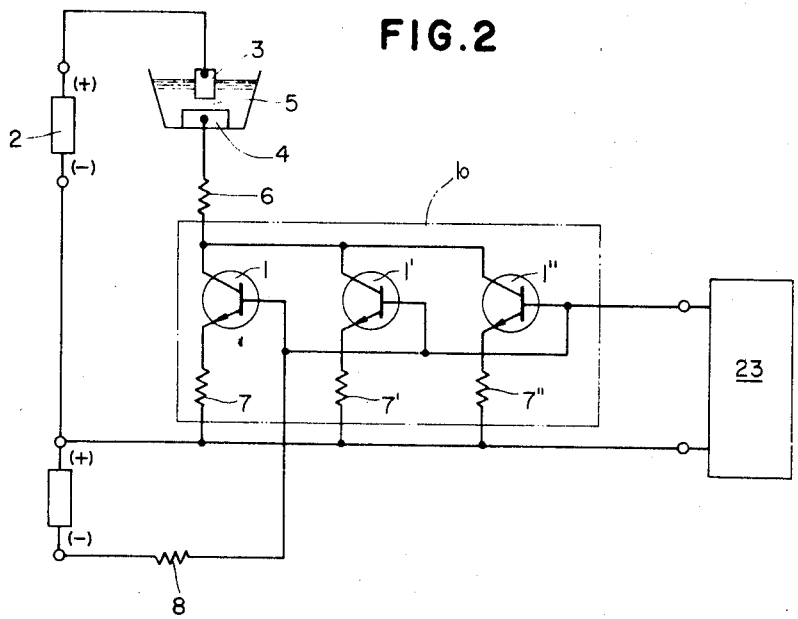

POWER SOURCE DEVICE FOR ELECTRICAL DISCHARGE MACHINING

This invention relates to a power source device for electric discharge machining, which produces an electrical discharge current between an electrode and a workpiece, so that the workpiece is partially removed by the discharge current for effecting desired work thereon, such as perforation, shaping, engraving, cutting, grinding, and the like.

An object of the present invention is to provide a power source device for electrical discharge machining, based on a series switching system of the emitter follower type, which has heretofore been considered to be impossible to construct.

Another object of the present invention is to provide an independent impulse type power source, in which a short-circuit current is limited to a level lower than the discharge current level for machining as opposed to a known power source of independent impulse type, wherein upon occurrence of a short circuit across a discharge gap, a short-circuit current flows, whose magnitude is larger than that of the normal discharge current for machining.

It is another object of the present invention to provide an improved power source device for electrical discharge machining, in which a maximum value (peak value) of the machining discharge current is present, depending on the magnitude of a machining area (that is a surface area of an electrode which faces a workpiece so as to define a discharge gap), in such a manner that the discharge current can be increased up to the preset value, as the machining conditions vary. If the machining operation becomes unstable, the machining discharge current is immediately reduced.

Other objects and advantages of the present invention may be appreciated by referring to the following description and claims, taken in conjunction with the accompanying drawings, in which:

FIGS. 1a, 1b, and 1c are schematic diagrams collector-follower-type, transistor switching circuits of series switching system of the collector-follower-type, parallel switching system, and series switching system of the emitter-follower-type, respectively;

FIG. 2 is a circuit diagram of a power source device, using a series switching system of the collector-follower-type;

Figure 6:
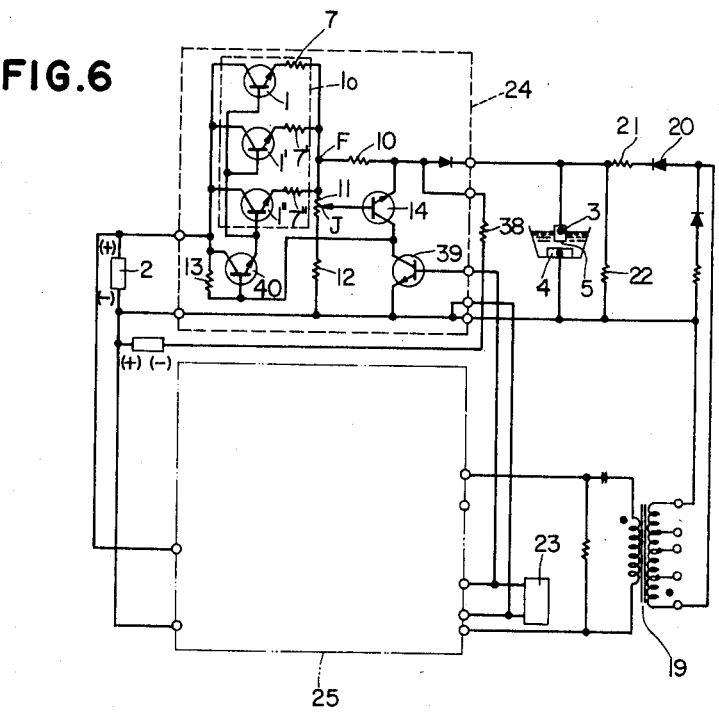
FIG. 6 is a circuit diagram of a power source device of the invention, including a high-voltage generating means.
Figure 7:
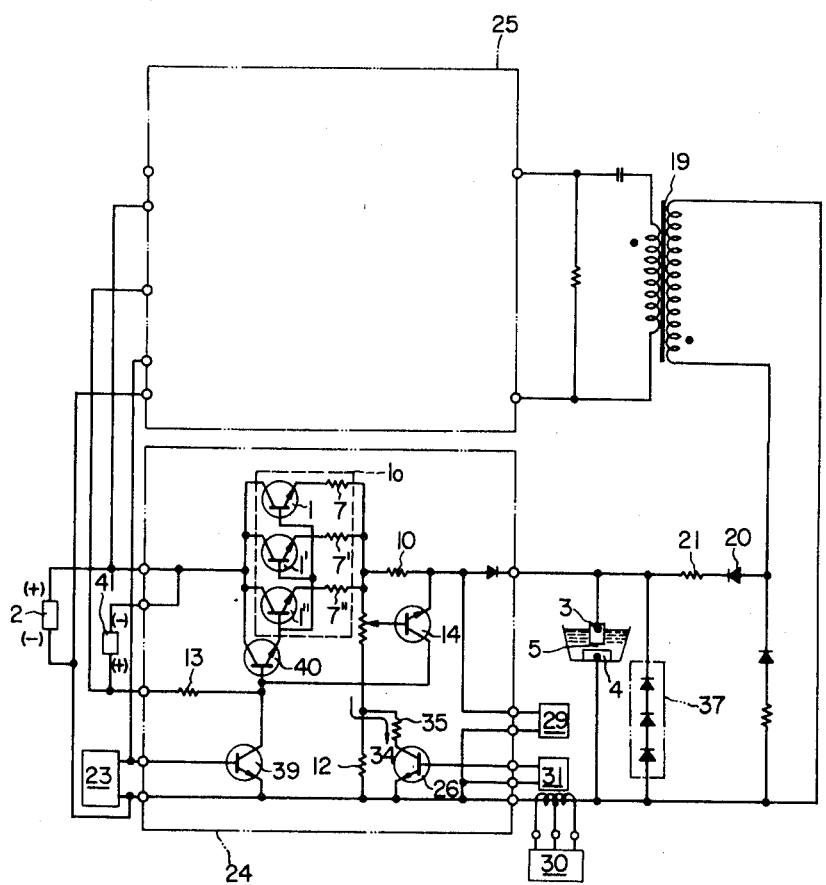
FIG. 7 is a circuit diagram of the power source device of FIG. 6, including a means for controlling the machining maximum value of the discharge current.
Figure 8:
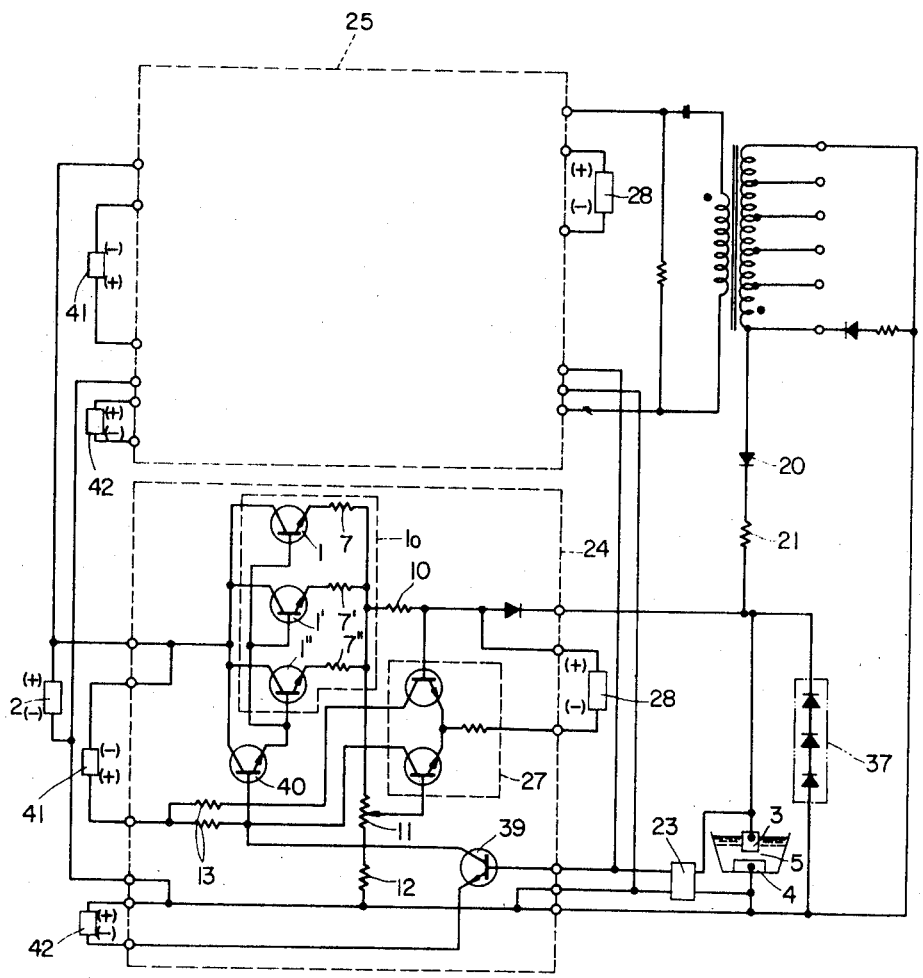
Figure 9:
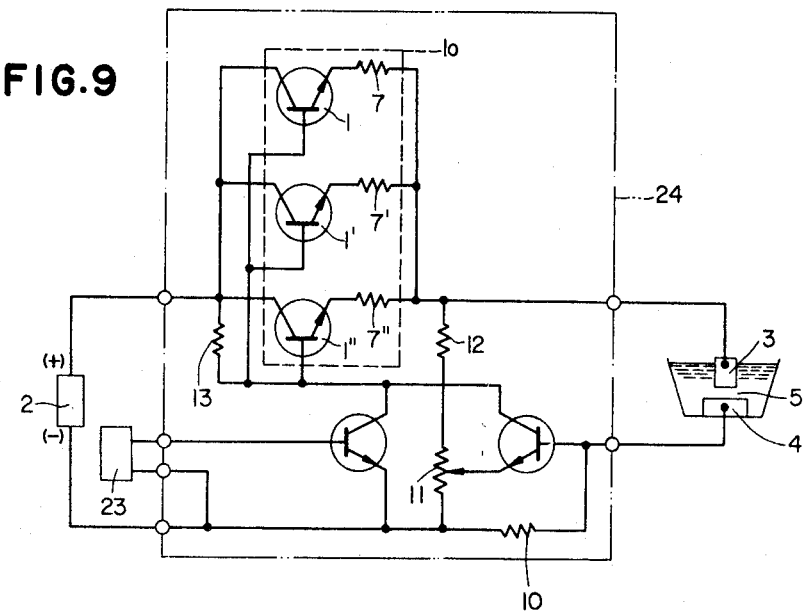
Figure 10:
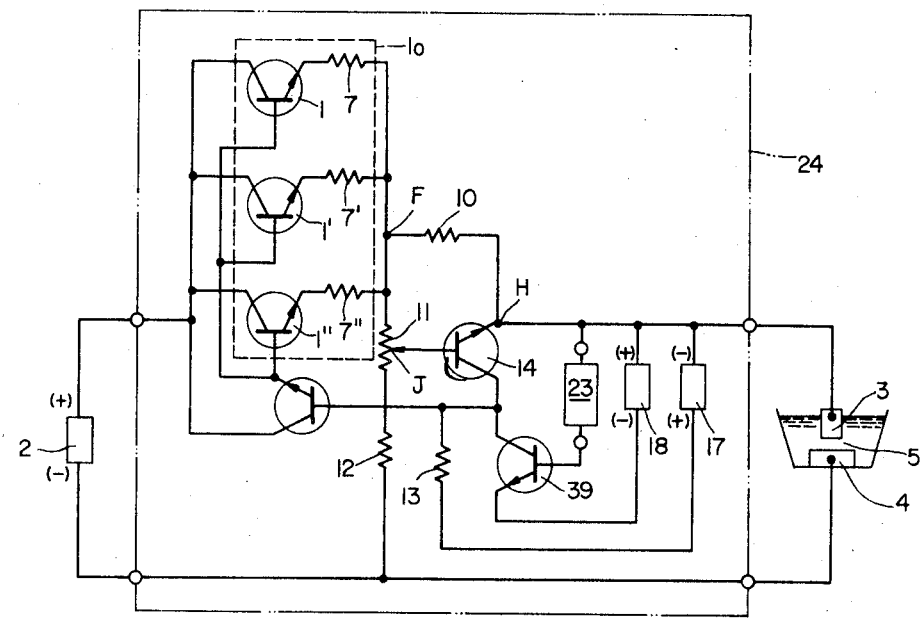
Figure 11:
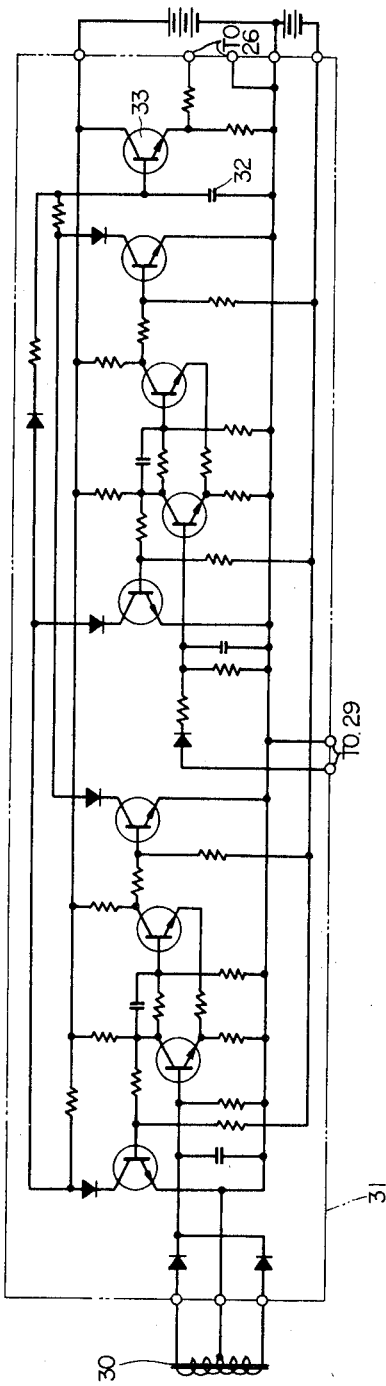
Figure 12:
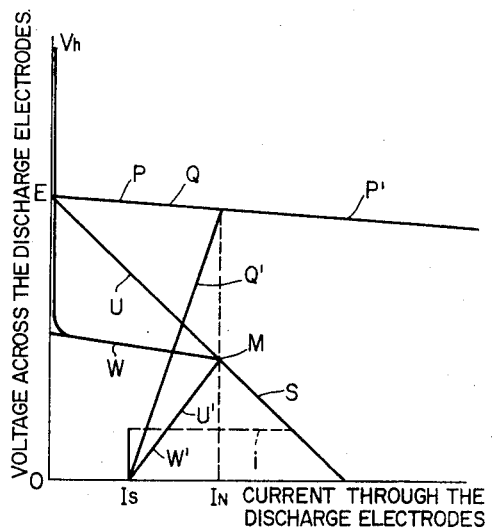
Figure 13:
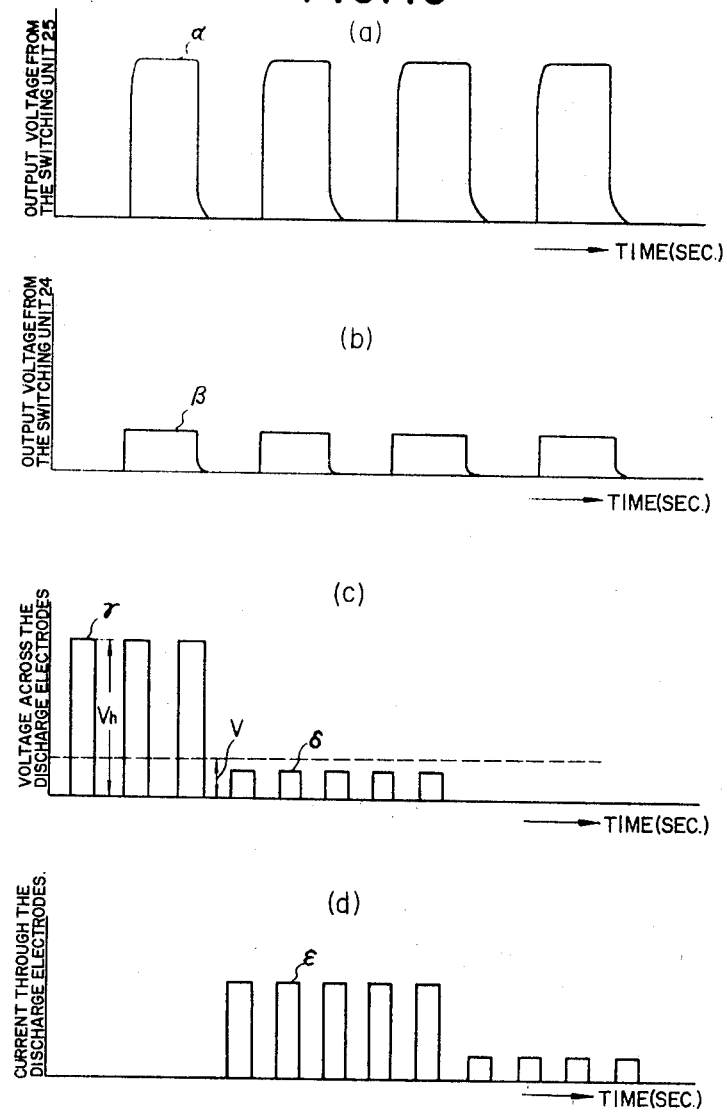
Figure 14:
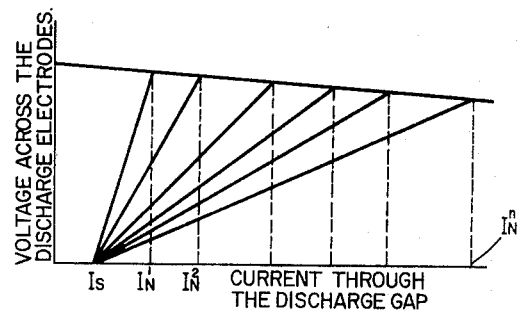
Figure 15:
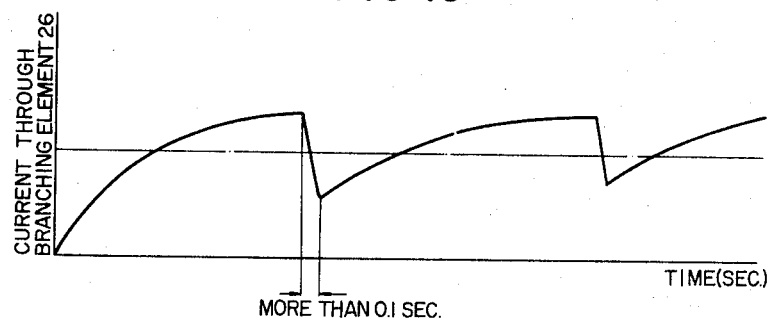
Figure 16:
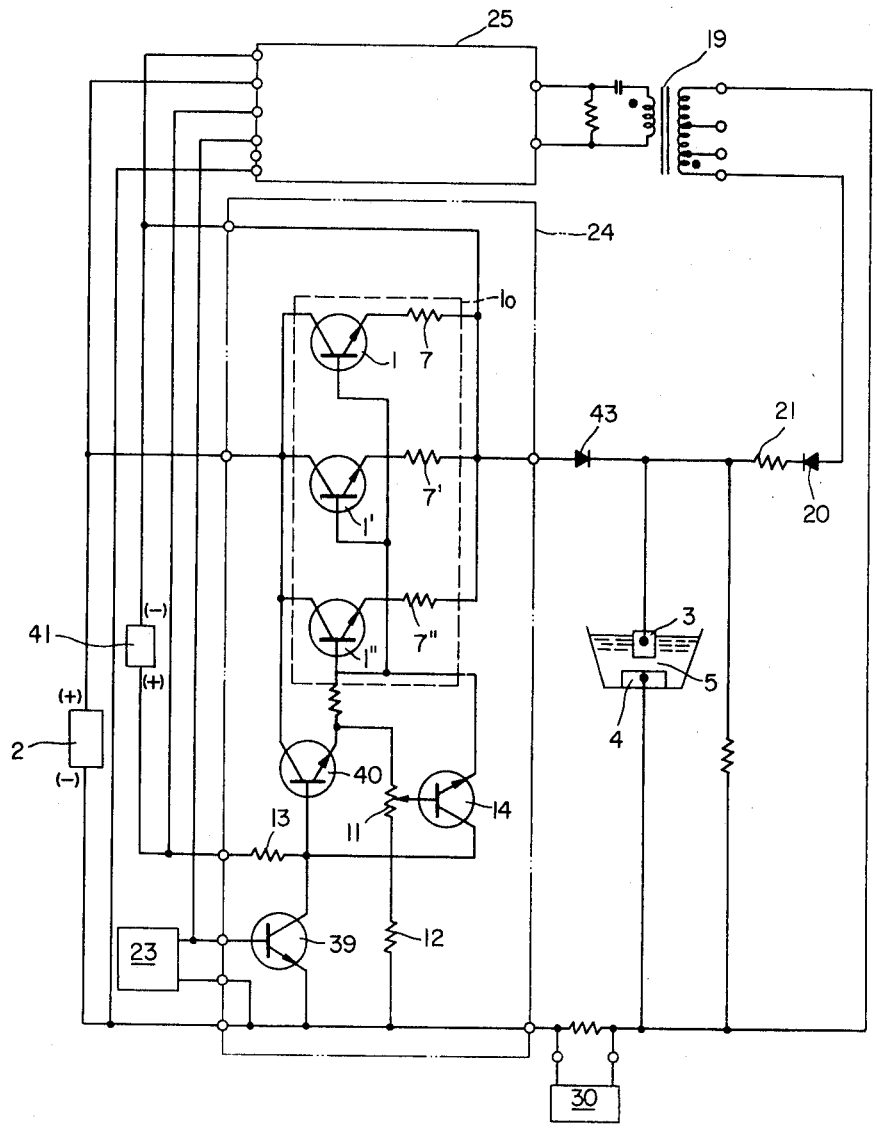
Figure 17:
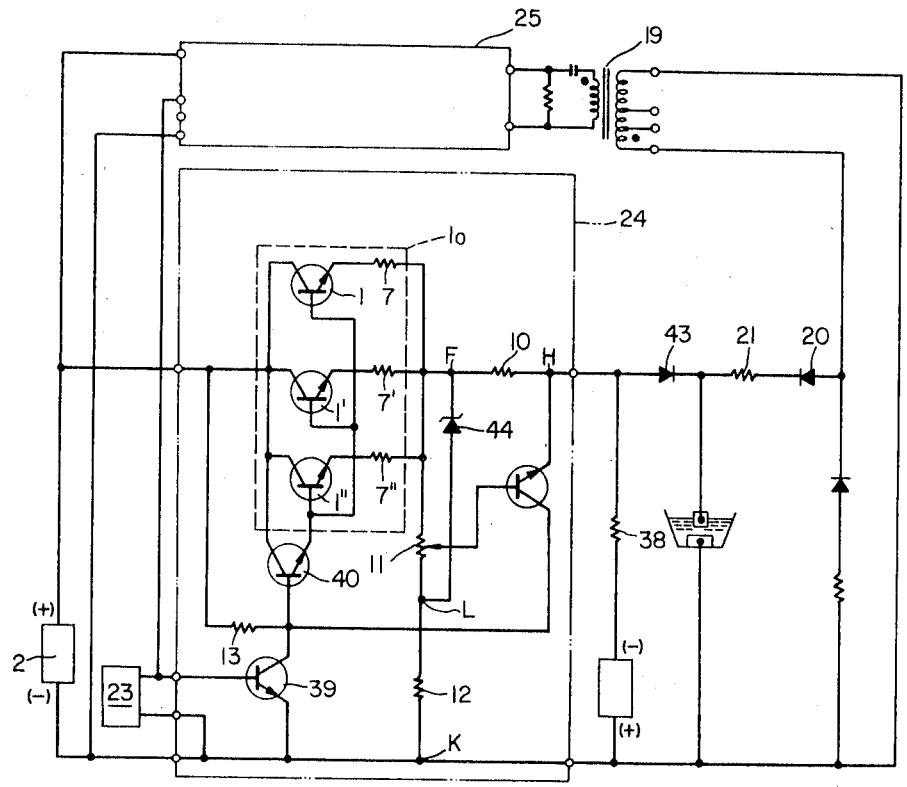
Figure 18:
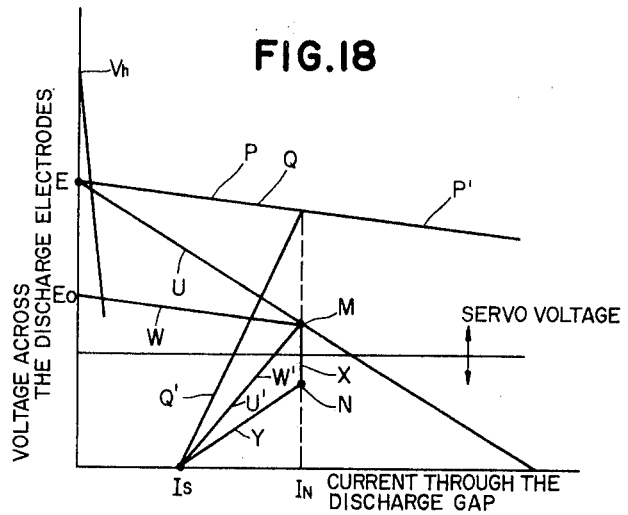

FIG. 8, 9, and 10 are circuit diagrams of different embodiments of the invention, respectively;

FIG. 11 is a circuit diagram of a logical control circuit;

FIG. 12 is a graph, showing the relation between the magnitude of the machining discharge current and the voltage across discharging electrodes;

FIGS. 13a to 13d are graphs, illustrating the characteristics of voltage across the discharge gap in the circuit of FIG. 6;

FIG. 14 is a graph, showing the characteristics of current for machining in the circuit of FIG. 7;

FIG. 15 is a graph, showing the time variation of a current through a branch element;

FIGS. 16 and 17 are circuit diagrams, illustrating the manner in which the power source device of the present invention operates; and FIG. 18 is a graph, similar to FIG. 12, illustrating the operative characteristics of the circuits of FIGS. 16 and 17.

Like parts are designated by like numerals and symbols throughout the drawings.

Before describing the details of the present invention, three different transistor switching circuits, which may be used in the power source device of the invention, will be described, referring to FIGS. 1a to 1c. The transistor switching circuits per se of FIGS. 1a to 1c are known to those skilled in the art. In the following description it is assumed that the power source impedance of the switching circuits of FIGS. 1a to 1c is so small as to be negligible.

In FIG. 1a, a series switching system of the collector-follower type uses a transistor chopper in a circuit for converting a direct current into a series of pulses by intermittently chopping. The transistor chopper of FIG. 1a comprises a switching element (transistor) 1 and a load impedance $Z_L$, which are connected in series with each other, while connecting the load impedance $Z_L$ to the collector of the transistor 1. Thus, when the switching element 1 is turned on, an electric current flows through the load impedance $Z_L$. Woolman and Growelt in their Japanese Patent Publication No. 9,399/1966, disclosed a power source device for electric discharge machining, which is based on the collector-follower type transistor chopper, as shown in FIG. 1a. The load impedance $Z_L$ in the circuit of FIG. 1a is a passive two-terminal impedance, which consists of a discharge gap between electrodes, lead wires, a series resistor (a current-limiting resistor), a diode, etc.

A parallel switching system, as illustrated in FIG. 1b, also constitutes a transistor chopper. In this circuit, a switching element (transistor 1) is connected in parallel with a load impedance $Z_L$, and a current-limiting impedance $Z_S$ is connected between a power source 2 and a joint of the aforesaid switching element and the load impedance. Accordingly, the magnitude of a short-circuit current in the circuit of FIG. 1b is determined by the current-limiting impedance and the voltage of the power source. The operation of the circuit of FIG. 1b is different from that of FIG. 1a in that an output current flows through the load impedance $Z_L$ of FIG. 1b only when the transistor 1 is turned off. Power source devices for electric discharge machining, based on the parallel switching system, as shown in FIG. 1b, have been known, referring for instance, to U.S. Pat. No. 3,056,065, which was granted to Cecil P. Porterfield on Sept. 25, 1962, and Japanese Patent Publications No. 16,000/1967 and No. 15,040/1968, both granted to Toshio Asaeda and Iwao Kondo. The current-limiting impedance $Z_S$ of FIG. 1b is a two-terminal impedance including a resistance, an inductance, a capacitance, and a semiconductor element.

In the aforesaid two systems, the presence of the load impedance $Z_L$ or the current-limiting impedance $Z_S$ acts to protect the transistor 1 and the power source 2 from detrimental effects of a short circuit at a discharge gap contained in the load impedance $Z_L$.

Actual power source devices for electrical discharge machining, based on the known collector-follower type series switching system and the known parallel switching system will now be described, together with the advantages and disadvantages thereof.

Figure 5:
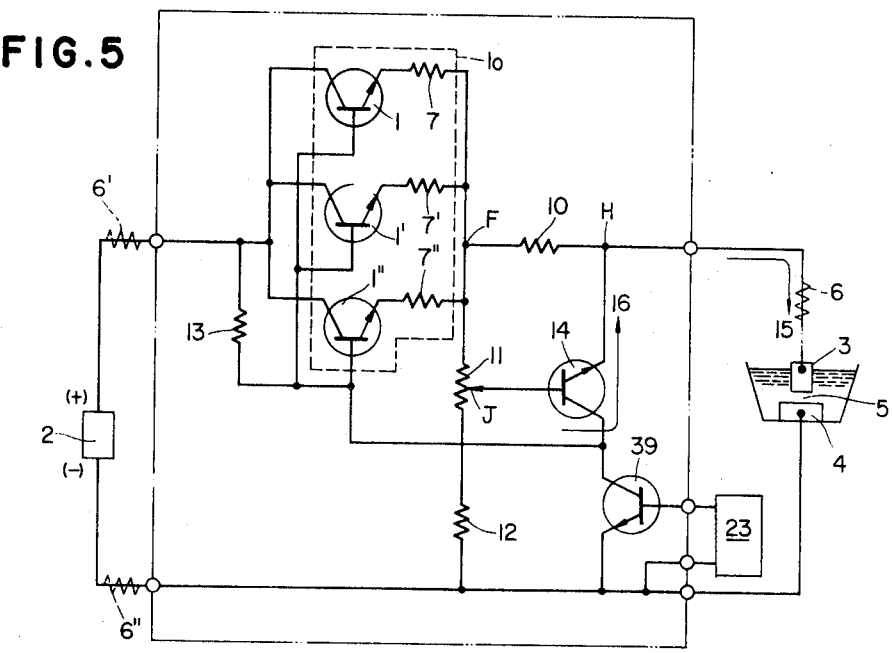
FIG. 5 is a simplified circuit diagram of a power source device, according to the present invention.

Both a dependent impulse circuit (in which the discharging period depends on the physical conditions of discharge gap between electrodes) and an independent impulse circuit (in which the discharging period is independent of the physical conditions of the discharge gap between electrodes) are used as an impulse generator for electrical discharge machining. FIG. 5 illustrates an example of the independent impulse circuites. In the figure, a pulse generator 23 intermittently actuates switching elements 1 and 39. The output wave from the pulse generator 23 may be of any suitable shape, and any suitable duty factor may be assigned to the pulse oscillator.

FIG. 2 shows an actual circuit for a power source device for electrical discharge machining, based on the series switching system of the collector-follower type. The circuit of FIG. 2, in order to cause a discharge across an electrode 3 and a workpiece 4 requires the breaking of the insulation therebetween. At the same time, the magnitude of the discharge gap 5 must be maintained at a value suitable for the desired machining operation. Therefore, the voltage of the power source 2 should be comparatively high, e.g., 50 to 100 volts. The arc voltage during the discharge across the electrode 3 and the workpiece 4 is less than 30 volts, and it is considerably lower than the output voltage of the power source 2. The difference between the arc drop and the output voltage of the power source 2 is absorbed by the voltage drop across a current-limiting resistor 6.

Transistors 1, 1', and 1'' are usually connected in parallel. When the transistor switch, made of the last-mentioned three transistors, is turned on, the emitter-collector voltage is less than 1 volt. Resistors 7, 7', and 7'', each being of 0.2 to 10 ohms, are connected to the emitters of the aforesaid transistors, with the intent of equalizing the electric currents flowing through the transistors 1, 1', and 1''. A resistor 8 is used for turning off the transistors completely when there is no output from the pulse generator 23.

If the electrode 3 is short circuited with the workpiece 4, in the device of FIG. 2, the short circuit current $I_S$ is approximately equivalent to the quotient of the resistance R of the current limiting resistor 6 to the voltage V of the power source 2; namely, $I_S = V/R$. Such relation is shown in FIG. 12 as a straight line characteristics S. One of the important features of the collector-follower-type series switching system is in that the input power to the base of the transistor 1 for intermittent interruption for electrical discharge machining may be small. On the other hand, the collector-follower-type series switching system has the following shortcomings.

1. A large amount of heat is inevitably generated in the resistor 6.
2. The use of a Darlington circuit for the transistor 1 is very difficult, because the maximum voltage applicable to the first-stage transistor thereof is low (generally speaking, the maximum voltage applicable across the collector and the emitter of a transistor with small capacity is low). As a result, a power source with a large current-carrying capacity has to be used in the first stage circuit.
3. The short-circuit current is always larger than the machining current.
4. The transistor 1 must have a high withstanding voltage.
5. Either one of the electrode 3 and the workpiece 4 is not at the same potential with that of the ground (emitter) of a driving circuit.

Figure 3:
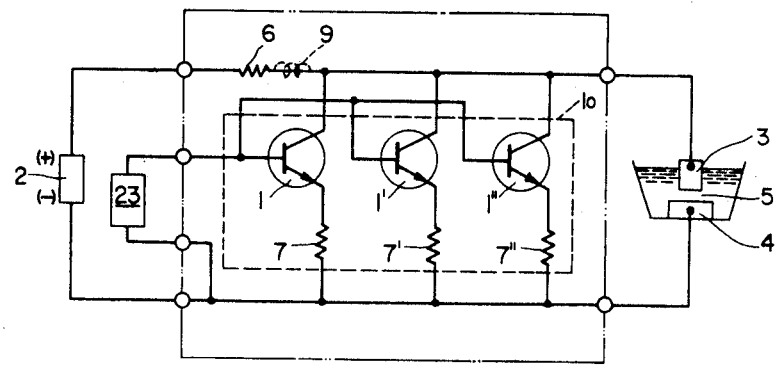
FIG. 3 is a circuit diagram of a power source device, based on the parallel switching system.

FIG. 3 illustrates an example of practical parallel switching systems for electrical discharge machining. With the circuit of FIG. 3, when the transistors 1, 1', and 1'' are turned on, the voltage across an electrode 3 and a workpiece 4 is reduced close to zero (for instance, less than about 1 volt), and the arc through a discharge gap 5 is extinguished or interrupted. On the other hand, when the transistors 1, 1', and 1'' are turned off, the voltage V of the power source 2 is substantially directly applied across the electrode 3 and the workpiece 4, so as to initiate the discharge therethrough. Accordingly, the voltage V of the power source 2 in this parallel switching system is substantially equivalent to that of the series switching system. Under certain conditions, by inserting an inductance 9 in series with a current-limiting resistor 6, as shown through dotted lines in FIG. 3, the voltage of the power source 2 can be selected to be somewhat lower than the aforesaid value.

The advantages of the parallel switching system are as follows:

1. Either one of the electrode 3 and the workpiece 4 can be directly connected to the ground side (emitter) of the driving circuit of the transistors 1, 1', and 1''.
2. A low-output voltage V of the power source 2 can be used under certain conditions, by inserting an inductance 9 in series with a current-limiting resistor 6.

On the other hand, the shortcomings of the parallel switching system are as follows:

1. Power efficiency is low, as compared with that of the collector-follower type series switching system, and the heat generation in the current-limiting resistor 6 is very large.
2. The transistors 1, 1', and 1'' must have a very high withstanding voltage.
3. The short-circuit current, in response to the short circuit of the electrode 3 with the workpiece 4, is larger than the machining current, as in the case of the aforesaid series switching system.
4. The use of the Darlington circuit is almost impossible in the parallel switching system, in view of the same reasons as those of the collector-follower type series switching system.

Referring to FIG. 1c, there is provided an emitter-follower type series switching system. One of the important features of the emitter-follower type switching system is in the smallness of its output impedance. On the other hand, if the discharge gap (or the load impedance $Z_L$) is short circuited, there will be no current-limiting impedance in a closed circuit. Accordingly, and excessively large current flows through a transistor 1, which may in the worst instance, damage the transistor 1. Due to such shortcoming, the emitter-follower type transistor chipper has not been heretofore used as a power source circuit for the electrical discharge machining operation.

An object of the present invention is to provide a means for detection of an increase of machining current in excess of maximum value, so as to reduce the machining current, whereby the efficiency of electrical discharge machining operation can be improved.

In order to limit the maximum machining current, it has been proposed to use a plurality of switching units $1_o$, each consisting of switching elements like 1, 1', and 1'', connected in parallel, and to connect the parallel switching unit $1_o$ in series to the machining electrode of collector-follower type switching system, so that the switch units may be operated in parallel under normal machining operation, while turning off all the switching units except one upon increase of the machining current in excess of a certain predetermined value. Whereby, the overall impedance of the circuit increases, so as to reduce the machining current, as shown by Curve $i$ in FIG. 12.

However, the use of such parallel switching units inevitably makes the overall circuit complicated.

Therefore, an object of the present invention is to provide a current-limiting circuit of simple construction, by connecting a discharge electrode and a current-detecting resistor in series with each other, and then connecting a voltage divider in parallel to the series-connected electrode and the current-detecting resistor. The increase of the machining current in excess of a certain predetermined value is detected by the current-detecting resistor. The current-detecting resistor generates an output signal upon detection of such an excessively large machining current, and with the output signal controlling bypass element. The bypass element in turn controls the switching element so as to reduce the machining current.

Robert S. Webb U.S. Pat. No. 3,178,551, granted on Apr. 13, 1965, discloses a current-sensitive per-pulse cutoff circuit, which includes a current-detecting element and is used for interruption of machining current in an electrical discharge machining device. The current-detecting element in Webb's circuit, however, is inserted in series between the collector of a transistor and a power source. In other words, the switching transistor of Webb's circuit operates as a collector-follower type element. Accordingly, a transistor for current detection in the Webb's circuit must have a high withstanding voltage. Furthermore, in order to cut off a transistor switch in Webb's circuit, at least one phase-converting or phase-inverting transistor must be provided immediately after the current-detecting transistor.

Webb's circuit has a further limitation in that the output voltage from a power source, e.g., storage batteries, is applied to a discharge gap across an electrode and a workpiece, through a resistor, which is intended both for current detection and current limitation. In other words, the machining voltage is also used for insulation breakdown. Thus, with Webb's circuit, the power source voltage must be higher than as in the present invention. More particularly, the operative characteristics of Webb's circuit are similar to those, as represented by straight lines U, U' of FIG. 12. The capacity of the power source in Webb's circuit must be about twice as large as that of the present invention. With the circuit of the present invention, the efficiency of the power is doubled as compared with that of Webb's circuit, in performing the same function. The use of a synchronized high voltage in the present invention has made such an improvement in efficiency possible.

Figure 4:
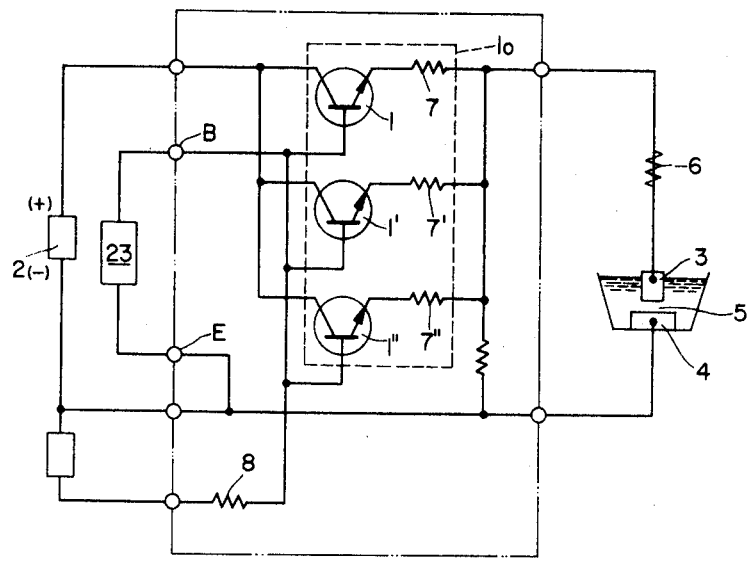
FIG. 4 is a diagrammatic illustration of a power source device, using the series switching system of the emitter-follower-type.

The invention will now be described in further detail, by referring to an emitter-follower type transistor switching system, which is particularly suitable for fulfilling the object of the invention. FIG. 4 illustrates a power source device for electrical discharge machining, based on an emitter follower transistor switching circuit. The voltage V of the power source of the circuit of FIG. 4 should be the same as that of the circuit of FIG. 3, because in both circuits, the insulation of the discharge gap 5 must be broken through while maintaining a certain magnitude thereof.

A current-limiting resistor 6 must be connected, in series, to the gap 5. If no such current-limiting resistor is provided, upon eventual establishing of a short circuit between the electrode 3 and the workpiece 4, such an excessively large electric current which flows through the transistors 1, 1', and 1'' may instantaneously damage the transistors. Such conditions are represented by a straight line P in FIG. 12.

As a feature of an emitter-follower type circuit, the input voltages between the common base terminal B of the transistors 1, 1', and 1'' and the ground terminal E should be as high as the full power source voltage V.

Accordingly, the circuit of FIG. 4 cannot be applied directly to an actual power source device for electrical discharge machining, even if a current-limiting resistor 6 is inserted in series with the discharge gap.

In a preferred embodiment of the present invention, as shown in FIG. 5, a current-detecting resistor 10, an electrode 3, and a workpiece 4 are connected in series to a transistor switching element means $1_o$. A voltage divider consisting of resistors 11 and 12 is connected in parallel to the aforesaid series circuit including the current-detecting resistor 10, the electrode 3, and the workpiece 4. One end of the voltage divider is connected to the emitter of the switching element means $1_o$.

A bypass transistor 14 has a base connected to the resistor 11 of the voltage divider, a collector connected to the base of the switching element means $1_o$, and an emitter connected to a juncture between the current-detecting resistor 10 and the machining electrode 3. A resistor 13 is connected, in series, to the base of the switching element means $1_o$, so as to feed an electric current to the base from the collector circuit.

The switching element means $1_o$ of FIG. 5 comprises three transistors 1, 1', and 1'', which are connected in parallel with each other, and the bases of the three transistors are joined together, so that the juncture is connected to the collector circuit of a bypass transistor 14. The current-detecting resistor 10 senses the magnitude of the machining current and the presence of a short-circuit current, and the resistance value of the resistor 10 is smaller than that of the current-limiting resistor 6 in the circuit of FIG. 4. The resistance value of the current-detecting resistor 10 is approximately given by $$R_{10} = 0.8/I_S$$

wherein $I_S$ represents a short-circuit current (See FIG. 12).

As the insulation of the discharge gap 5 defined between the machining electrode 3 and the workpiece 4 collapses, a machining current flows through the discharge gap, as shown by an arrow 15. As a result, there is produced a voltage drop across the current-detecting resistor 10, with a potential at the terminal F being positive relative to that of the terminal H. This voltage drop falls in a range of 2 to 3 volts to the utmost for normal machining currents. A fraction of the output voltage (i.e., the voltage across the discharge gap) is given between the terminals F and J, by means of the voltage divider including the resistors 11 and 12. The resistor 11 has a slidable terminal J, which is so adjusted that, during the normal machining operation, the voltage drop across the terminals F and J is the same as the voltage drop across the current-detecting resistor 10. In other words, the voltage drop across the terminal J and H is zero for normal machining operation.

Accordingly, there is, as a result, no collector current in the bypass transistor 14. Referring to FIG. 12, as the machining current exceeds a preset value $I_N$, the voltage drop across the terminals F and H surpasses that between the terminals F and J, so that the terminal J becomes positive as compared with the terminal H. Consequently, the polarity of the voltage between the terminals J and H is changed, in response to the aforesaid increase in the machining current.

In view of the foregoing, a collector current flows through the bypass transistor 14, as shown by an arrow 16 (FIG. 5). In other words, a current, which previously flowed into the bases of the transistors 1, 1' and 1'' through the resistor 13, is now bypassed through the transistor 14 in the direction of the arrow 16. Thus, the exciting base current of the transistors 1, 1', and 1'' is reduced, so as to reduce the machining current, as shown by a line Q' in FIG. 12. At the same time, the output voltage is also reduced.

Succinctly, with the circuit of FIG. 5, when the machining electrode 3 is short circuited with the workpiece 4, the machining current is reduced. Thus, the transistors 1, 1', and 1'' are never damaged through such a short circuit.

The magnitude of the short-circuit current in the circuit of FIG. 5 depends almost solely on the resistance value of the current-detecting resistor 10. The short-circuit current is usually about one-third of the maximum machining current.

In order to further limit the short-circuit current (e.g., to about one-tenth of the maximum machining current), the bypass transistor 14, which acts as a simple amplifier may be replaced by a differential amplifier 27, as shown in FIG. 8. The use of the differential amplifier, however, necessitates an auxiliary power source 28.

In lieu of the circuit of FIG. 5, it is possible to use the circuit of FIG. 9. The circuit of FIG. 9 is also an emitter-follower type transistor switching circuit, similar to that of the circuit of FIG. 5. The relative position of the current-detecting resistor 10 and the discharge gap 5 in the circuit of FIG. 9 is contrary to that of the circuit of FIG. 5. In essence, one of the differences between circuits of FIGS. 5 and 9 lies in the position of the current-detecting resistor 10 in the overall circuit.

FIG. 10 illustrates another circuit, which is essentially a collector-follower circuit. The operative characteristics of the collector-follower-type circuit of FIG. 10 can be made similar to those of an emitter-follower-type circuit, by directly connecting the collectors of a switching element means $1_o$ to a power source, without passing through a current-limiting resistor, and by not using a current-limiting resistor in the emitter circuit. The circuit of FIG. 10 is different from those of FIGS. 5, 8 and 9 in that separate power sources 17 and 18 are provided, and that a terminal H (connected to a machining electrode 3) is used as a reference (group) point during the machining operation.

The difference between the aforesaid emitter-follower type circuit and the collector follower type circuit can be said to lie in as to whether the input signal is applied across the base and the ground through a load resistor, or is directly applied across the emitter and the base. Since the internal resistance of the power source is assumed to be negligible, it is not critical as to whether to connect a load (the discharge gap and the current-limiting resistor) to a collector circuit to an emitter circuit.

With the aforesaid circuit arrangement, the following features can thus be achieved.

1. It has been heretofore considered to be almost impossible to use an emitter-follower type transistor switching circuit in an electrical discharge machining device. The inventor has succeeded in overcoming such difficulty by incorporating a short-circuit-protecting circuit in the emitter-follower-type transistor switching circuit.

2. By combining a circuit for limiting the machining current and an emitter-follower type transistor chopper, the output voltage of a power source 2 can be reduced from 40 to 20 volts. At the same time, a current-limiting resistor 6 may be eliminated. As a result, heat loss in the resistor can be mitigated. Consequently, the power efficiency can greatly be improved by the present invention.

3. In a commonly used power source device for independent impulse type electrical machining, the short circuit current is always larger than the machining current during the machining operation. In the circuit of the invention, however, the short circuit current $I_S$ is reduced to about one-third of the machining current and such a short circuit current does not give any detrimental effects to the power source 2 and the transistors 1, 1′, and 1″.

4. Resistors having small resistance values are disposed in the circuit of the invention, however such resistors, namely 7, 7′, 7″, and 10, do not limit the machining current by themselves. The resistor 10 is intended for current detection, whereas the resistors 7, 7′ and 7″ are for equalizing the currents through the transistors 1, 1′, and 1″.

5. The use of an emitter-follower-type transistor chopper makes it possible to directly connect the ground wire of a pulse generator 23 to a workpiece 5 (forming one of the electrodes of a discharge gap). With the direct connection or common junction of the workpiece and the pulse generator, the construction of other circuit elements is simplified and their operation is stabilized; namely, a circuit for periodically raising the electrode, a servo circuit, a circuit for automatically measuring the conductance of the discharge gap, a circuit for automatically measuring the working area, etc.

6. The machining current of various magnitudes may be regulated by using a suitable number of transistor switching circuit units 24 in parallel.

7. An emitter-follower-type transistor chopper is characterized in that its output impedance is very small as compared with that of other choppers of similar type. Accordingly, the regulation of the output voltage is considerably improved, and the power efficiency is correspondingly improved.

As can be seen from the lines Q and Q′ in FIG. 12, with the emitter-follower-type transistor switching circuit, the output voltage variation is very small as long as a normal machining current $I_N$ flows therethrough. If a power source voltage is high, a current-limiting resistor 6 must be inserted in the passage of the machining current $I_N$ (along the arrow 15 of FIG. 5), in series therewith, so as to compensate for the difference between the power source voltage and the discharge arc voltage (about 30 to 15 volts) at the normal machining current $I_N$. If such current-limiting resistor 6 is used, the heat generation in the circuit is increased, and the power efficiency deteriorates. (The performance characteristics become those shown by lines U, U′ in FIG. 12, and the power efficiency is lowered down to about 50 percent.)

On the other hand, if the output voltage of the power source 2 is selected to be only slightly higher than the discharge arc voltage (about 30 to 15 volts), the power consumption at the discharge gap during the machining amounts to 80 percent or more of the output power from the power source 2. (In effect, the power efficiency is improved up to 80 percent or higher.) In FIG. 5, the low output voltage of the power source 2 allows the use of transistors 1, 1′, and 1″ with a comparatively low withstanding voltage. At the same time the Darlington circuit may be used in the exiting stage (or a prestage) of the transistors 1, 1′, and 1″ (see FIG. 7). As a result, the performance characteristics become those shown by lines W, W′ in FIG. 12.

The use of a low output voltage V of the power source 2, however, tends to provide a too low voltage across the discharge gap 5, which may cause some difficulties in machining operation. In order to mitigate such difficulty, it is proposed to use a switching unit 25 for high-voltage generation, as shown in FIG. 6. The output from the switching unit 25 is stepped up by a transformer 19, and then rectified by a rectifier 20, so as to generate impulses, as shown by the wave form $\alpha$ in FIG. 13a. The pulses from the switching unit 25 are superposed on the output from the transistor switching unit 24, having its waveform represented by the symbol $\beta$ of FIG. 13b. The superposed voltages are represented by the waveform $\gamma$ of FIG. 13c, and the combined voltage is then applied across the discharge gap 5 between the electrode 3 and the workpiece 4.

In the circuits of FIGS. 6, 7 and 8, the output from the switching unit 25, which is similar to the transistor switching unit 24 in construction, is stepped up by the transformer 19. The high voltage thus generated is then rectified by a rectifier 20 and applied across the electrode 3 and the workpiece 4. The inventor discloses the machining with low-voltage high-current pulses in his Japanese Utility Model Application No. 57,996/1964, Japanese Patent Application No. 95,224/1968 and Japanese Patent Application No. 60,964/1964, in which a high-voltage blocking diode 43 (FIG. 16) is connected in series to a DC switching circuit, so that the output from the switching circuit is stepped up by a transformer and then rectified, for producing a high voltage for breaking through the insulation of the discharge gap. After the insulation breakthrough, the machining is then carried out by low-voltage high-current pulses.

More particularly, the insulation of the discharge gap 5 collapses through the aforesaid impulse high voltage $V_h$ (FIG. 12). Accordingly, the fluctuation in the magnitude of the discharge gap 5 may be regulated by varying or switching the output voltage from the transformer 19. After the collapse of the insulation through the discharge gap 5, the voltage applied thereto is reduced, as shown by the waveform $\delta$ of FIG. 13c, while large current pulses flow therethrough, as shown by the waveforms $\epsilon$ of FIG. 13d.

In FIG. 6, resistors 21 and 22 constitute a voltage divider for preventing the generation of an abnormally high voltage. The resistor 21 also acts as a current-limiting resistor in the high-voltage generating circuitry, in the event of discharge or short circuit across the electrode 3 and the workpiece 4.

It is well known in electrical discharge machining that the magnitude of the machining current depends on dimension of the electrode surface (hereinafter referred to as the "machining area,"), which consists of an electrode and a workpiece disposed in face-to-face relationship defining a discharge gap. In other words, for processing a larger machining area, a larger value is selected for the machining current, while conversely for processing a smaller machining area, the machining current selected is smaller. However, the direct measurement of the machining area during the machining operation is almost impossible to attain. In practice, it has been tried to determine the machining area and the machining current based on the following criteria.

1. The normally available maximum machining current is determined, based on the approximate value of the machining area, which is presumed from the shape and dimension of the electrodes.
2. The machining operation is started with a machining current slightly smaller than that as determined by the preceding item (1).
3. It is estimated whether the initial machining current is too large or too small, based on the sound and the operation of the servos, which are affected by the number of repetitions of short circuits (or repetition frequency of discharge) per unit time at the discharge gap between the electrode and the workpiece.
4. The indication of an ammeter for the machining current is read for the purpose of reference.
5. The steps (3) and (4), or the steps (1), (2), (3), and (4), are repeated at uniform time intervals.

In the above itemized criteria, only the item (1) has a direct relation with the dimension of the electrode or the machining area. Accordingly, the machining area may usefully be measured during the machining operation, by measuring, for instance, the capacitance between the electrodes. Nevertheless, the circuits for such measurement will become very complicated. Furthermore, it is very difficult to maintain constant measuring conditions (e.g., keeping the discharge gap constant).

It is one of the primary objects of the present invention that a stable machining current is automatically established by using a special impulse-generating circuit. More particularly, according to the present invention, no direct measurement is made on the capacitance or the machining area. When the commonly usable maximum machining current, as determined by the item (1), is maintained at a set value (either an ultimate value or a normal value), and when the machining current increases, in order to effect an increase of the repetition frequency of the short circuit per unit time, the magnitude of the machining current is reduced in dependence upon the repetition frequency of the short circuit, by means of the special arrangement in the impulse generating circuit.

In the collector-follower-type series transistor switching system of FIG. 2, or in the case of the transistor parallel switching circuit of FIG. 3, the resistance value of the current-limiting resistor 6 must be modified in order to change the machining current. Accordingly, if it is desired to change the machining current during the machining operation, depending upon the machining conditions, the resistance value of the current-limiting resistor 6 must be made varied by using a large number of relays, or alternatively a portion of the transistors 1, 1', and 1'' of FIG. 2 must be temporarily turned off. With that type of arrangement however, much time is consumed and the construction of the circuitry becomes complicated.

According to the present invention, in order to fulfill the aforesaid object, a discharge electrode and a current-detecting resistor are connected in series, and a voltage divider is connected in parallel with the series circuit thus prepared. A branching or shunting element is provided in the voltage divider, so that the maximum value (peak value) of the machining current can be determined by the adjustment of the rate of shunting by the shunting element.

FIG. 7 illustrates an embodiment of the present invention. A discharge electrode 3, a workpiece 4, and a current-detecting resistor 10 are connected, in series, to a transistor switching element means $1_o$. A voltage divider, consisting of resistors 11 and 12, is connected in parallel to the series connected circuit including the current-detecting resistor 10, the electrode 3, and the workpiece 4. One end of the voltage divider is connected to the juncture between the switching element means $1_o$ and the current-detecting resistor 10. A base current shunting element 14 of the switching element means $1_o$, which operates by comparing the voltage drops across the current-detecting resistor 10 and across the voltage divider resistors 11 and 12, is so connected as to be parallel both to the switching element means $1_o$ and to the current-detecting resistor 10. Another current-shunting element 26 is connected in parallel to the resistor 12 of the voltage divider. The rate of current-shunting is varied, depending on the conditions of the discharge gap 5, so that the machining current can be increased to a preset maximum value.

As a means for varying the rate of current-shunting in response to the conditions of the discharge gap 5, a voltage detector 29 is provided in parallel to the discharge gap 5, while a machining current detector 30 is provided in the circuit of the electrode 3 and the workpiece 4, whereby the output signals from the detectors 29 and 30 are fed to a logical control circuit 31. The output from the logical control circuit 31 is used for regulating the current-shunting element 26, so as to control the rate of current-shunting.

FIG. 11 is a schematic diagram of an embodiment of such logical circuit 31, which consists of a pair of Schmitt circuits. The output terminals of the detectors 29 and 30 are connected to the input terminals of the two Schmitt circuits, so that a capacitor 32 is charged only when both the output voltage and the machining current are present, i.e., only when both of the detectors and 30 are on. As the capacitor 32 is charged, the output from the transistor 33 increases, so as to very gradually increase the rate of shunting hy the shunting transistor element 26. As a result, the maximum value of the machining current through the transistors 1, 1', and 1'' is increased.

On the other hand, if the discharge gap 5 is reduced to a state close to short-circuit, the output voltage is almost completely diminished (detector 29 being off), while the machining current is maintained (detector 30 being on). Accordingly, the rate of shunting is rapidly decreased, so as to reduce the magnitude (intensity) of the machining current comparatively quickly. Similarly, if the discharge gap 5 is completely insulated without any machining current, the output voltage is present (detector 29 being on), however, there is then no machining current (detector 30 being off), and the logical circuit acts to reduce the rate of shunting by the shunting element 26. The short circuit current $I_S$ acts independent of the rate of shunting, as shown in FIG. 14.

The illustrated embodiment is actuated by the mean value of the pulses, namely by a DC voltage. It is possible to use a circuit without the charging capacitor 32, whereby the circuit can be actuated directly by the pulses. In the circuit of FIG. 7, when the two detectors 29 and 30 are on simultaneously, the output from the logical circuit 31 increases the base current of the shunting element 26, so that the collector current (as shown by the arrow 34) increases, thereby intensifying the voltage drop across the resistor 11. FIG. 15 shows the variation of the collector current as a function of elapsed time. As shown in the FIG., a stable discharge is maintained through the discharge gap, with short circuits occurring from time to time, while the machining current (machining speed) is maintained substantially at a constant level. (see FIGS. 13a to 13d). Since the collector current of the shunting transistor element 26 is limited to below a certain value by means of a resistor 35, the machining current (machining speed) does not increase in excess of a predetermined level.

If a short circuit between the electrode 3 and the workpiece 4 is maintained for more than a predetermined period of time, the logical control circuit 31 is actuated, so as to reduce the maximum machining current. As a result, if the resistance value of the resistor 35 which is in series with the shunting transistor element 26 is made variable in response to the maximum machining current, the maximum value of the machining current through the machining circuit can be changed, depending on the machining area, as shown by $I_N^1$, $I_n^2$,...$I_N^n$ in FIG. 14.

In order to obtain the aforesaid increase of the machining current, the time constant of the collector current circuit 34 of the shunting transistor element 26 should preferably fall in the range of about 0.1 sec. to about 10 sec. for most machining applications.

In order to obtain the reduction of the machining current, the corresponding time constant of the collector current circuit should preferably fall in the range of about 0.01 sec. to about 1 sec.

The distinctions of the circuit of the present invention over that of Webb's U.S. Pat. No. 3,178,551 will now be described. In the circuit of the invention, the current-detecting resistor 10, the electrode 3, and the workpiece 4 are disposed on the emitter side of the switching transistors 1, 1', and 1''. Accordingly, the circuit on the side of the workpiece 4 may be grounded, while such grounding can not be made in Webb's circuit. The grounding system of the circuit of the present invention is therefore preferable for the circuit control.

The transistor 14 of the circuit of the invention corresponds to a transistor 114 of Webb's circuit. The insulating strength of the transistor 14 can be lower than that of the transistor 114.

The collector of the current-controlling transistor 14 of the present invention is either directly connected to the bases of the switching transistors 1, 1', and 1'', or directly connected to the base of a current-amplifying transistor 40, which constitutes a Darlington circuit together with the switching transistors 1, 1', and 1''. As a result, according to the present invention, a linearity is unconditionally ensured in a loop, which consists of the base input of the current-controlling transistor 14, collector of the transistor 14, the base of the transistor 40, the bases of the switching transistors 1, 1', 1'', the emitters of the transistors 1, 1', 1'', emitter resistors 7, 7', 7'', current-detecting resistor 10, and a voltage across the terminals J and H depending on the voltage drop across the variable resistor 11. Accordingly, with the circuit of the present invention, the electrical discharge machining be stably effected in a current reducing zone along the lines U' and W' in FIG. 12. In essence, with the circuit of the present invention, there is an elimination of rapid jumps between the operating point M and the short-circuit current $I_S$. Furthermore, if only the maximum machining current value is set at the terminal J of the variable resistor 11, the characteristics curves U' and W' become substantially rectilinear without any adjustment. Accordingly, the electrical discharge machining and the automatic control of the electrodes are possible within the range of the rectilinear characteristics U' and W'.

On the other hand, in the case of Webb's circuit, when the transistor 114 is turned on upon detection of the maximum current, complementary amplification is done in several steps by transistors 106, 98, and 84. As a result, the region from the operating point M to the short-circuit current $I_S$ is precipitously and sharply cut off.

In short, the construction of the detecting circuit per se is similar to Webb's circuit, however the characteristics of the circuits are vastly different, due to the construction of the other portions of the circuits.

FIG. 16 illustrates another embodiment of the present invention. In the Figure, and electrode 3, a workpiece 4, and resistors 11 and 12 are connected to the emitter side of switching transistors 1, 1', and 1'', unlike Webb's circuit. When the machining current amounts to several hundred amperes, the power loss in the current-detecting resistor 10 becomes very large. Accordingly, in the circuit of FIG. 16, a machining current-detecting resistor 10' is inserted between the switching transistor 1 and the emitter of a current-amplifying transistor 40, which constitutes a part of a Darlington Circuit. The emitter of the transistor switching element means $1_a$ is directly connected to the electrode 3 through the current-dividing resistors 7, 7', and 7''. One of the important features of the circuit of FIG. 16 is in that the power capacity of the current-detecting resistor 10' becomes the inverse of the current amplification factor of the transistors 1, 1', and 1'' (for instance about 1/20 to 1/50), and that almost 80 percent to 90 percent of the output from a power source 2 is consumed in the machining process. The electrode servomechanism is operated in response to the linear voltage variation in the region between the operating point M and the short-circuit current $I_S$ (see FIG. 18).

FIG. 17 illustrates still another embodiment of the invention. In the Figure, a high-frequency constant voltage diode 44 is connected across a variable resistor 11 in a voltage divider. With the construction of the circuit of FIG. 17, if the voltage across the terminals F and K diminishes, in response to a large machining current through the resistor 10, the voltage across the resistor 11, i.e., between the terminals F and L, may be retained at a Zenor voltage of the constant voltage diode 44. Accordingly, the voltage-current characteristics between the electrode 3 and the workpiece 4 produces a constant current region X, as shown in FIG. 18. The short-circuit current $I_S$ of the circuit of FIG. 17 is the same as that of FIG. 6. There is produced another linear portion Y between the operating point N and the short-circuit current $I_S$ without any sudden change or jumps, as shown in FIG. 18. When applying the circuit of FIG. 17, the voltage variation in the constant current region MN can be also used for automatic control of electrodes. Furthermore, the current carrying capacity of the power source need not be larger than $I_N$. Thus, the circuit can be constructed at a low cost.

The salient features of the present invention can accordingly be summarized as follows.

1. The maximum machining current automatically reduces at the beginning and at the end of the machining operation. (With known devices, the operators effected such control of the machining current, having to rely on experience.)
2. Upon occurrence of a short circuit between the electrode 3 and the workpiece 4, the machining current becomes smaller than that for stable machining operation. The magnitude of this short-circuit current is substantially independent of the maximum machining current.
3. Only one control of the machining current, which is to be made by the operation, is the setting of the maximum machining current. Thus, manpower is greatly saved.
4. By the introduction of a logical control circuit 31, the aforesaid current and voltage control is made possible.
5. The resistance values of the resistors 11 and 12, constituting a voltage divider, can be considerably large, (for instance, several K Ohms), and the current flowing through such resistors is very small. With a few ma. of the collector current 34 of the shunting transistor element 26, the machining current can be controlled from several ten A. In other words, a large machining current is controlled by regulating a small control current.

When a separate high-voltage generating circuit is used, as shown in FIGS. 6 to 8, the pulse generator 23 may be used for driving the two switching units 24 and 25. With such common pulse generator 23, the two switching units are operated in synchronism with each other, and the high voltage for collapsing the insulation of the discharge gap 5 is applied thereto only when the switching unit 24 is on. A resistor 22, which is connected in parallel to the discharge gap 5 for preventing abnormal voltages, can be substituted by a constant voltage diode means 37, as shown in FIGS. 7 and 8. Whereby, the high voltage for insulation breakthrough, which is applied across the discharge gap 5, will become substantially constant through the diode means 37. As the insulation breakthrough voltage is stabilized by the diode 37, the magnitude of the discharge gap 5 can also be kept substantially constant, for practical purposes.

In the examples of FIGS. 6 to 8, a transformer 19 is used for generating a high voltage to be applied across the discharge gap for insulation breakthrough. Any other suitable high-voltage generating means can be used, instead of the transformer 19, namely, a vacuum tube, a suitable pulser, an inductor generating a high counter voltage, and the like.

In the circuit of FIG. 6, a resistor 38 and a separate power source in series therewith are provided for preventing a leakage current from being applied to the output terminals (leading to the electrode 3 and the workpiece 4). Such leakage current tends to be generated when the transistor 39 is turned on, while turning off the transistors 40, 1, 1', and 1''.

An auxiliary power source 41 in FIGS. 7 and 8 is useful in saturating the bases of the transistors 40, 1, 1' and 1'', when the transistor 39 is turned off while turning on the transistors 40, 1, 1', and 1''. In order to provide a large power source for supplying a large machining current, a suitable number of transistor switching units 24, may be incorporated in the circuit in parallel with each other.

Instead of the series circuit consisting of the resistor 38 and the separate power source in FIG. 6, an auxiliary power source 42 may be used, as shown in FIG. 8, for the purpose of preventing the propagation of the leakage current. In the circuit of FIG. 8, when the transistor 39 is turned on, a voltage corresponding to the collector-emitter voltage of the transistor 39 (less than about 1 volt) is applied to the transistors 48, 1, 1', and 1'' as a bias voltage, for completely turning off the latter transistors.

In the circuit of FIG. 5, the addition of the current limiting resistors 6, 6', and 6'' will not affect the operative characteristics of the circuit, except that the slope of the operative characteristics line W of FIG. 12 is changed. The power efficiency is, of course, reduced by the addition of such resistors, but the increase in the slope of the linear operative characteristics makes it easy to control the electrodes.

In the circuit of the present invention, Darlington circuits are used for exciting the output stage transistors 1, 1', and 1''. In other words, the collector of the transistor 40 is directly connected to the collectors of the transistors 1, 1', and 1''. Accordingly, the transistors 1, 1', and 1'' are not saturated during the machining operation. With such an arrangement, the linearity of the circuit is ensured, and the linear operative characteristics U' and W' of FIG. 12 are closely followed. The machining current gradually decreases when surpassing the preset maximum value, but never be suddenly cut off. When the circuit of the present invention is operated along the operative characteristics lines U' and W', the transistors 1, 1', and 1'' may be heated to a certain extent, but such heating is not harmful at all for practical purposes. The resistor 11 is illustrated as a variable resistor, but it may be constituted of a pair of accurately calibrated fixed resistors. The switching transistor element means $1_o$ is shown as a combination of three transistors in FIGS. 3, 4, 5, 6, 7, 8, 9, 10, 16, and 17. The number of transistors in the switching element means is not limited to three, but any suitable number of transistors may be used therein. Furthermore, the pulse generator 23 of FIG. 8 may be such that it operates in response to the voltage across the discharge gap.

Although the present invention has been described with a certain degree of particularity, it is understood that the present disclosure has been made only by way of example and that various modifications in the details of construction and the combination and arrangement of parts may be resorted to without departing from the spirit and the scope of the invention as hereinafter claimed.

What is claimed is:

1. A power source device for machining a workpiece through electronically generating a discharge across a gap formed between said workpiece and an electrode, comprising an electric source, a transistor switching element means, a current detecting resistor, a variable voltage divider means and a bypassing transistor means, said switching means and said resistor being arranged between said source and said discharge gap so that the collector circuit of said switching means is connected with one terminal of said source while the emitter circuit thereof is connected through said resistor and said discharge gap to the other terminal of said source to form a series circuit, said voltage divider means being connected in parallel to said series circuit so that one end of said voltage divider means is connected to the emitter circuit of said switching circuit while the other end to a ground line from said gap to said other end of the electric source, said bypassing means being so arranged that the base and emitter circuits thereof are connected respectively to a variably positioned contact to said voltage divider means and to the series circuit between said resistor and said discharge gap while the collector circuit of said bypassing means is connected to the base circuit of said switching means whereby when a current of the discharge is increased beyond a current value to be set by means of varying said voltage divider contact position as a desirable maximum value then a signal detected across the junctions of the emitter and base circuits of said bypassing means in the form of polarity reverse actuates said bypassing means to control said switching means for decreasing the discharge current down to the preset maximum value.

2. A power source device as claimed in claim 1, in which said switching means consists of a plurality of transistors connected to one another with a collector, emitter and base circuit and cooperates with a prestige transistor of which the collector is connected with said collector circuit while the emitter of said prestige transistor is connected to said base circuit so that the collector circuit of said bypassing means is connected through the base of said prestige transistor with the base circuit of said switching means.

3. A power source device as claimed in claim 1, in which said bypassing means comprises a pair of transistors connected together with their collector circuits which are connected to the base circuit of said switching means, a first of said bypassing transistor is connected at the base and emitter thereof respectively to the variably positioned contact of the voltage divider means and to the series circuit between said resistor and said discharge gap, said power source device further comprising a pulse generator of which one terminal is connected to said ground line while the other terminal is connected to the base of the second bypassing transistor of which the emitter is connected to said ground line.

4. A power source device as claimed in claim 3, which further comprises a high-voltage generating circuit adapted to be intermittently actuated in synchronism with an ON and OFF of said transistor switching means so that the output from said high-voltage generating circuit is additionally applied across the discharge gap whereby said electric source may be of lower voltage output.

5. A power source device as claimed in claim 1, in which said voltage divider means comprises a variable resistor and a fixed resistor inner ends of which are connected with each other so that the outer end of said variable resistor is connected to the emitter circuit of said switching means while the outer end of said fixed resistor is connected to said ground line, said power source device further comprising a shunting element for shunting a part of the current flowing through said fixed resistor depending on a condition at the discharge gap whereby a current of the discharge may be increased.

6. A power source device as claimed in claim 5, in which said shunting element is a transistor of which the collector is connected to the voltage divider between the variable resistor and the fixed resistor, the emitter of said shunting transistor being connected to said ground line, said power source device further comprising a voltage detecting means and a current detecting means arranged respectively for detecting the discharge voltage and current of which outputs are fed into a logic circuit means of which output terminals are connected respectively to the base of said shunting transistor and to said earth line so as to control said shunting transistor for automatically increasing the discharge current depending on the discharge condition up to a preset maximum current value.

7. A power source device as claimed in claim 6, in which said logic circuit means comprises two Schmitt circuits connected with each other, a capacitor and an output transistor each input terminals of said two circuits being fed with the respective output of said discharge voltage and current detecting means, so that only when both the voltage and current detecting means are ON said capacitor is charged to increase the output of said output transistor whereby the collector current of said shunting transistor is increased for increasing the shunted current.

8. A power source device as claimed in claim 2, in which said bypassing transistor means comprises a differential amplifier consisting of two transistors in pair and a third transistor, said pair of transistors being connected together with their collectors and emitters, said power source device further comprising a pulse generator and an auxiliary electric source so that the collectors of said differential amplifier is connected to the prestige transistor base and the emitters of said differential amplifier are connected to one end of said auxiliary source of which other end is connected to the series circuit between the current detecting resistor and the discharge gap, the base of the first transistor of the differential amplifier being connected to the series circuit between the current detecting resistor and the discharge gap while the base of the second transistor is connected to said movable contact of the variable resistor, said pulse generator being connected at one terminal to said ground line while the other terminal is connected to the third transistor base.

9. A power source device as claimed in claim 1, which further comprises a constant voltage diode, such as a Zener diode, of which opposite ends are connected respectively at the opposite ends of a variable resistor of the voltage divider whereby discharge current characteristics are kept stable.

* * * * *